United States Patent
Okada et al.

(10) Patent No.: US 11,242,916 B2
(45) Date of Patent: Feb. 8, 2022

(54) TENSIONER

(71) Applicant: TSUBAKIMOTO CHAIN CO., Osaka (JP)

(72) Inventors: Taichi Okada, Osaka (JP); Masanori Watanabe, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 151 days.

(21) Appl. No.: 16/728,190

(22) Filed: Dec. 27, 2019

(65) Prior Publication Data

US 2020/0256433 A1 Aug. 13, 2020

(30) Foreign Application Priority Data

Feb. 13, 2019 (JP) .............................. JP2019-023154

(51) Int. Cl.
*F16H 7/08* (2006.01)

(52) U.S. Cl.
CPC ....... *F16H 7/08* (2013.01); *F16H 2007/0802* (2013.01); *F16H 2007/0806* (2013.01); *F16H 2007/0812* (2013.01); *F16H 2007/0814* (2013.01); *F16H 2007/0859* (2013.01); *F16H 2007/0872* (2013.01); *F16H 2007/0895* (2013.01); *F16H 2007/0897* (2013.01)

(58) Field of Classification Search
CPC .. F16H 7/08; F16H 7/0836; F16H 2007/0802; F16H 2007/0806; F16H 2007/0812; F16H 2007/0842; F16H 2007/0859; F16H 2007/0891; F16H 2007/0895; F16H 2007/0897; F16H 2007/0857

USPC ........................................................ 474/110
See application file for complete search history.

(56) References Cited

U.S. PATENT DOCUMENTS

| | | | | | |
|---|---|---|---|---|---|
| 4,722,720 A | * | 2/1988 | Ojima | ..................... | F16H 7/129 474/101 |
| 4,772,251 A | * | 9/1988 | Goppelt | .................... | F16H 7/08 474/101 |
| 4,792,322 A | * | 12/1988 | Goppelt | .................... | F16H 7/08 474/136 |
| 4,850,941 A | * | 7/1989 | Sosson | ...................... | F16H 7/08 474/110 |
| 4,863,417 A | * | 9/1989 | Kimata | ..................... | F16H 7/08 474/101 |

(Continued)

FOREIGN PATENT DOCUMENTS

| | | |
|---|---|---|
| JP | 2003-35343 A | 2/2003 |
| JP | 2003-202061 A | 7/2003 |
| WO | WO-2020032094 A1 * | 2/2020 ............... F16H 7/08 |

*Primary Examiner* — Michael R Mansen
*Assistant Examiner* — Raveen J Dias
(74) *Attorney, Agent, or Firm* — Westerman, Hattori, Daniels & Adrian, LLP (57) ABSTRACT

An object of the present invention is to provide a tensioner that has a reduced number of components and lighter weight and is easy to assemble. The tensioner according to the present invention is configured such that a base member is detachably and mechanically joined to a rear end opening of a cylindrical plunger with a closed front end against the resilience of biasing means that is accommodated inside the plunger such as to be freely extend and contract. The joint between the plunger and the base member is a mechanical connection that is one of a thread engagement, a press-fit, and a pin connection.

7 Claims, 7 Drawing Sheets

(56) References Cited

U.S. PATENT DOCUMENTS

| | | | | |
|---|---|---|---|---|
| 4,985,009 | A * | 1/1991 | Schmidt | F16F 9/50 |
| | | | | 474/110 |
| 5,860,365 | A * | 1/1999 | Lhotak | F16F 1/128 |
| | | | | 104/172.5 |
| 6,602,154 | B1 * | 8/2003 | Guichard | F16H 7/08 |
| | | | | 474/101 |
| 9,874,267 | B2 * | 1/2018 | Wigsten | F16H 7/0836 |
| 2003/0017893 | A1 | 1/2003 | Kaido et al. | |
| 2003/0125142 | A1 | 7/2003 | Hashimoto et al. | |
| 2008/0318717 | A1 * | 12/2008 | Kurematsu | F16H 7/0848 |
| | | | | 474/110 |
| 2009/0247336 | A1 * | 10/2009 | Bongard | F01L 1/022 |
| | | | | 474/110 |
| 2014/0100068 | A1 * | 4/2014 | Kurematsu | F16H 7/0836 |
| | | | | 474/110 |
| 2016/0084359 | A1 * | 3/2016 | Wigsten | F16H 7/0836 |
| | | | | 474/110 |
| 2016/0290447 | A1 * | 10/2016 | Kunimatsu | F16K 17/02 |
| 2017/0059012 | A1 * | 3/2017 | Watanabe | F16H 7/0848 |
| 2018/0087628 | A1 * | 3/2018 | Maeda | F16H 7/0836 |
| 2018/0313434 | A1 * | 11/2018 | Watanabe | F16H 7/08 |
| 2019/0107178 | A1 * | 4/2019 | Yoshida | F16H 7/0848 |
| 2019/0120343 | A1 * | 4/2019 | Watanabe | F16H 7/0836 |
| 2019/0257390 | A1 * | 8/2019 | Watanabe | F16H 7/0848 |
| 2020/0149614 | A1 * | 5/2020 | Okada | F16H 7/08 |
| 2021/0010570 | A1 * | 1/2021 | Kurematsu | F15B 15/149 |
| 2021/0131532 | A1 * | 5/2021 | Onimaru | F16H 7/0848 |

* cited by examiner

TENSIONER

BACKGROUND OF THE INVENTION

1. Field of the Invention

The present invention relates to a tensioner having a plunger, and biasing means accommodated in an oil pressure chamber formed inside the plunger such as to freely extend and contract, the tensioner not having a housing for supporting the plunger.

2. Description of the Related Art

It is the common practice to use a tensioner for keeping a correct tension of a chain. In a chain guide mechanism that slidably guides a drive chain such as an endless roller chain passing over respective sprockets of a crank shaft and a cam shaft inside an engine room with a guide shoe, for example, it is known to bias a pivoting chain guide having the guide shoe with a tensioner to keep a correct tension.

The known tensioner used in such a chain guide mechanism generally includes a housing having a cylindrical plunger bore with an open end, a cylindrical plunger inserted in the plunger bore to freely slide against a cylindrical surface of the plunger bore, and biasing means for biasing the plunger frontward that is the direction in which the plunger extends out of the plunger bore.

After the assembly, the plunger of the tensioner needs to be retained under pressure until the tensioner is fixed in position in an engine or the like to be used and ready to actually apply tension to a chain or the like. Various tensioners having a plunger stopper mechanism for keeping the plunger pushed inside of the housing to stop the plunger from coming out have been proposed before (see, for example, Japanese Patent Applications Laid-open No. 2003-202061 and Japanese Patent Applications Laid-open No. 2003-035343).

SUMMARY OF THE INVENTION

The housing used in the tensioner is commonly made of metal such as cast iron, aluminum alloy or the like and heavy itself. The weight of the whole engine in which the tensioner is installed is consequently increased, which leads to poorer fuel efficiency of the engine. It is therefore desired for tensioners to be more lightweight in view of the recent demand for better fuel economy of automobiles in which tensioners are installed.

From a weight reduction point of view, the tensioner should preferably not include a housing. However, known tensioners are configured with a housing where a mounting part is formed for fixedly attaching the tensioner to an object to which the tensioner is mounted, with the use of a suitable fastening member as required. Also, the plunger stopper mechanism for preventing the plunger from coming out is usually configured to fix the plunger to a housing, which makes it hard to design the tensioner without a housing.

The present invention was made in view of the circumstances described above, its object being to provide a tensioner that has a reduced number of components and lighter weight and is easy to assemble.

The tensioner according to the present invention includes: a cylindrical plunger with a closed front end; biasing means accommodated in an oil pressure chamber formed inside the plunger such as to freely extend and contract; and a base member detachably joined to a rear end opening of the plunger against the resilience of the biasing means, the plunger and the base member being joined by a mechanical connection that is one of thread engagement, press-fit, and pin connection, whereby the problem noted above is solved.

In the tensioner according to claim 1 of the present invention, the base member is mechanically joined to the rear end opening of the plunger in a detachable manner, so that the plunger can be fixed in a compressed state in the condition before the tensioner is attached to an object to which the tensioner is mounted. Therefore, the tensioner according to claim 1 of the present invention does not need a housing for supporting the plunger. The number of components of the tensioner is accordingly reduced, as a result of which the tensioner can be made significantly lighter. The reduction in weight of the tensioner is expected to contribute to better fuel economy of the engine.

According to the configuration as set forth in claim 2 of the present invention, the mechanical connection between the plunger and the base member can be disengaged by a simple operation of rotating the plunger relative to the base member, so that the tensioner can be attached easily to the object to which the tensioner is mounted, with improved work efficiency.

According to the configurations as set forth in claim 3 and claim 4 of the present invention, the mechanical connection between the plunger and the base member can be disengaged by the pressure of oil supplied to the oil pressure chamber being applied to the base member, which allows for easy assembling of the tensioner to the object to which the tensioner is mounted and improves work efficiency. According to the configuration as set forth in claim 4, the mechanical connection between the base member and the plunger is achieved not only by the press-fit of the base member into the plunger but also by the engagement between the engaging pawl of the plunger and the engaging groove of the base member, so that an unwanted disengagement of the mechanical connection between the plunger and the base member is reliably prevented.

According to the configuration as set forth in claim 5 of the present invention, the mechanical connection between the plunger and the base member can be disengaged by pulling out the stopper pin, so that the tensioner can be readily attached to an object to which the tensioner is mounted, with improved work efficiency. Moreover, when the oil pressure inside the oil pressure chamber builds up, the oil inside the oil pressure chamber can be discharged to the outside of the plunger through the plunger fixing hole.

According to the configurations as set forth in claim 6 and claim 7 of the present invention, the tensioner can be installed very easily, and since a fastening member such as a bolt for fixing the tensioner to the object to which the tensioner is mounted is not necessary, the work efficiency can be improved.

BRIEF DESCRIPTION OF THE DRAWINGS

FIG. 3 is a schematic perspective view illustrating the configuration of a mounting part for attaching the tensioner shown in FIG. 1 to an object the tensioner is to be mounted to;

FIG. 4 is a schematic cross-sectional view illustrating the structure for attaching the tensioner shown in FIG. 1 to an object the tensioner is to be mounted to;

DESCRIPTION OF THE PREFERRED EMBODIMENTS

The tensioner of the present invention does not have a housing for supporting a plunger, and is installed to an object to which the tensioner is mounted such as an engine block, for example, by being inserted into a tensioner insertion hole that has an oil discharge port. The tensioner of the present invention may be inserted in a suitable housing member when used.

Embodiment 1

Figure 1:
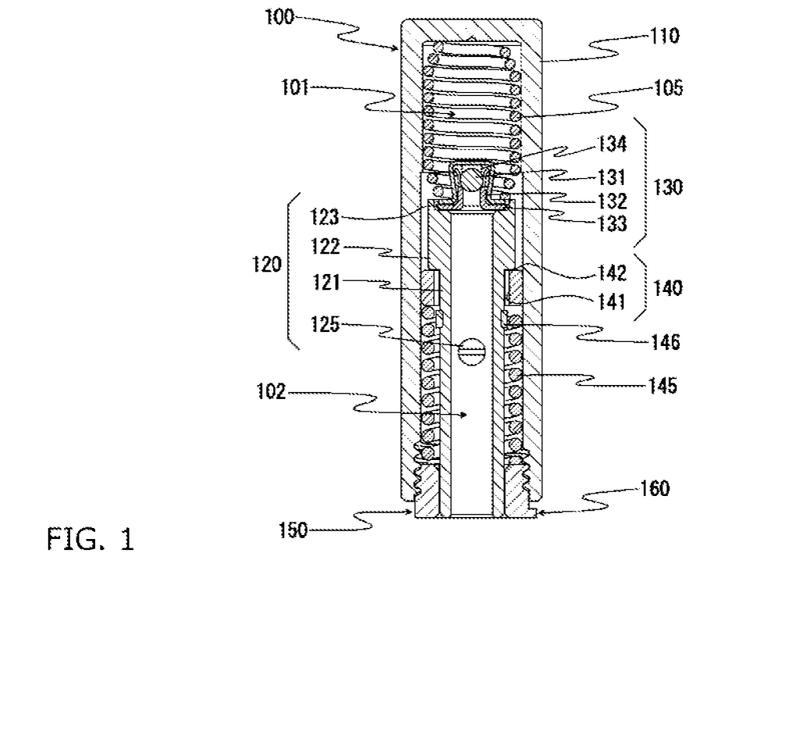
FIG. 1 is a cross-sectional view along an axial direction illustrating one configuration example of a tensioner according to a first embodiment of the present invention.

The tensioner 100 according to a first embodiment of the present invention includes, as shown in FIG. 1, a cylindrical plunger 110 with a closed front end, and a coil spring 105 that is biasing means accommodated in an oil pressure chamber 101 formed inside the plunger 110 such as to freely extend and contract.

Inside the plunger 110 are disposed an inner sleeve 120 including a pressure adjusting unit that prevents the pressure in the oil pressure chamber 101 from exceeding a predetermined level, and a check valve unit 130 that stops reverse flow of oil coming back into the oil pressure chamber 101.

The inner sleeve 120 in this embodiment is made up of a small-diameter tubular part 121 with a rear end portion extending axially out from an open end face of the plunger 110, and a large-diameter tubular part 122 continuous with the front end of the small-diameter tubular part 121 and forming a movement restricting part.

In the front end face of the inner sleeve 120 is formed a counterbore hole 123 that is part of a check valve unit setting part.

The check valve unit 130 includes a check ball 131, a retainer 132 holding the check ball 131 inside, a check valve seat 133 that opens and closes as the check ball 131 sits thereon and separates therefrom, and a ball pressing spring 134 that lightly presses the check ball 131 toward the check valve seat 133 inside the retainer 132.

The pressure adjusting unit includes an annular relief valve 140 slidably fitted on the outer circumferential surface of the small-diameter tubular part 121 of the inner sleeve 120 and making slidable contact with the inner circumferential surface of the plunger 110, a relief spring 145 biasing the relief valve 140 toward the movement restricting part, and a restriction member 146 provided at a predetermined position on the outer face of the small-diameter tubular part 121 to restrict the rearward movement of the relief valve 140. In this embodiment, the restriction member 146 is a ring-like member such as a C-ring, for example, which is fitted on the outer circumferential surface of the small-diameter tubular part 121.

The relief valve 140 has a relief groove 141 that allows oil from the oil pressure chamber 101 to flow in, and a front seal surface 142 at the front end face that abuts on the rear end face of the large-diameter tubular part 122 of the inner sleeve 120 to seal the oil pressure chamber 101.

In the configuration described above, the oil pressure chamber 101 is formed by the inner space of the plunger 110 that is disposed on the front side of the relief valve 140, and an oil reservoir chamber 102 is formed by the inner space of the inner sleeve 120 and an annular space formed between the plunger 110 and the inner sleeve 120 at the rear side of the relief valve 140. The annular space formed between the plunger 110 and the inner sleeve 120 and the inner space of the inner sleeve 120 are in fluid communication with each other via a reserve hole 125 formed in the small-diameter tubular part 121 of the inner sleeve 120.

Further, the tensioner 100 of this embodiment includes a base member mechanically joined to a rear side opening of the plunger 110 in a detachable manner against the resilience of the coil spring 105 and the relief spring 145.

Figure 2:
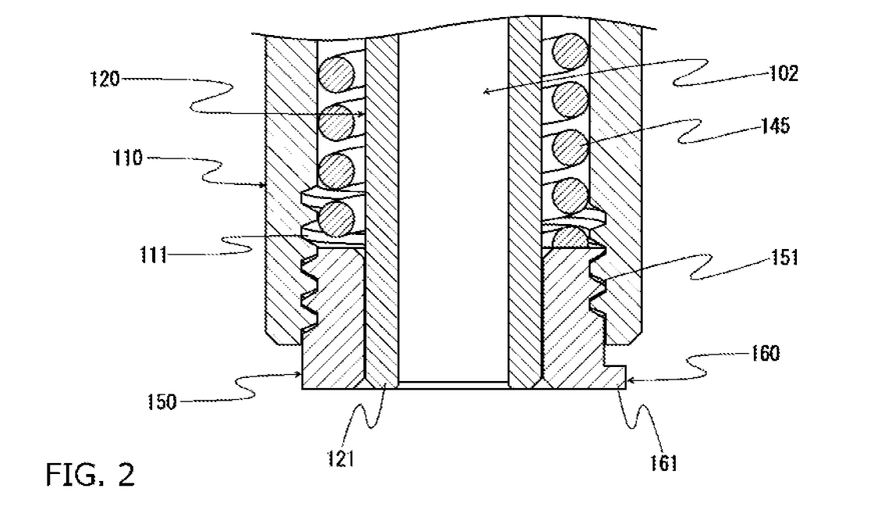
FIG. 2 is an enlarged view illustrating part of the tensioner shown in FIG. 1.

The base member 150 in this embodiment is cylindrical, for example, as shown in FIG. 2, with external threads 151 cut on the outer circumferential surface of a front end portion thereof.

The base member 150 is fitted to a rear end portion of the inner sleeve 120.

In the tensioner 100 of this embodiment, the plunger 110 includes internal threads 111 cut on an inner circumferential surface at the rear side opening, as shown in FIG. 2, to mate with the external threads 151 of the base member 150. Thus, the tensioner 100 of this embodiment is configured such that the mechanical connection between the plunger 110 and the base member 150 is achieved by thread engagement between the internal threads 111 of the plunger 110 and the external threads 151 of the base member 150.

The base member 150 also has a mounting part 160 for attachment to an object to which the tensioner is mounted.

Figure 3:
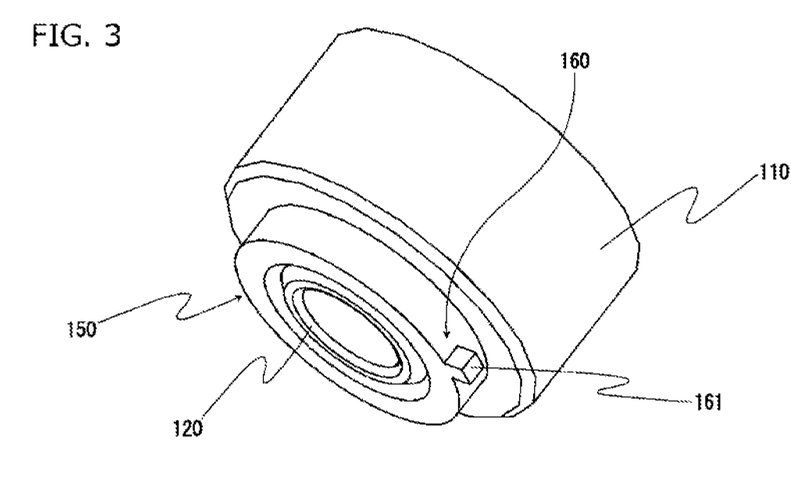

The mounting part 160 may be provided by forming a radially outwardly extending engaging projection 161 on the outer circumferential surface in a rear end portion of the base member 150, for example, as shown in FIG. 3.

Figure 4:
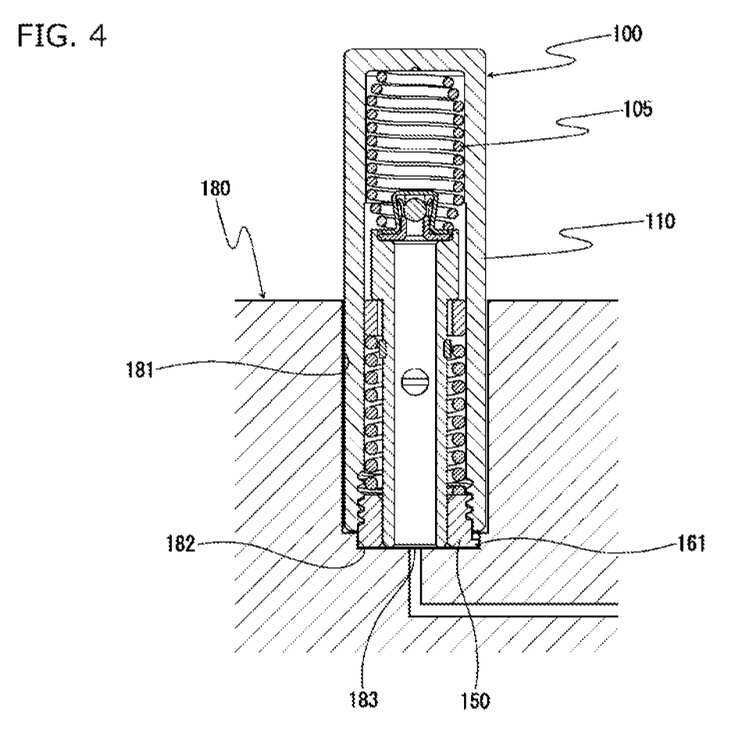

For use, the tensioner 100 of this embodiment can be inserted in a tensioner insertion hole 181 of an object 180 to which the tensioner is mounted such as an engine block, for example, with the mechanical connection between the plunger 110 and the base member 150 being kept as shown in FIG. 4. The tensioner insertion hole 181 includes a base member mounting concave section 182 at the bottom, and an oil discharge hole 183 that opens in the bottom surface of the base member mounting concave section 182, and accommodates the plunger 110 such that the plunger is slidable.

The mounting part 160 of the base member 150 is not limited to a particular configuration and may be formed by an axially extending engaging groove on the outer circumferential surface in a rear end portion of the base member 150, for example. Alternatively, a rear end portion of the base member 150 may be configured to be fitted into the base member mounting concave section 182 in the object 180 to which the tensioner is mounted.

After the tensioner 100 of this embodiment has been attached to the object 180 to which the tensioner is mounted, the mechanical connection between the plunger 110 and the base member 150 is disengaged.

Figure 5A:
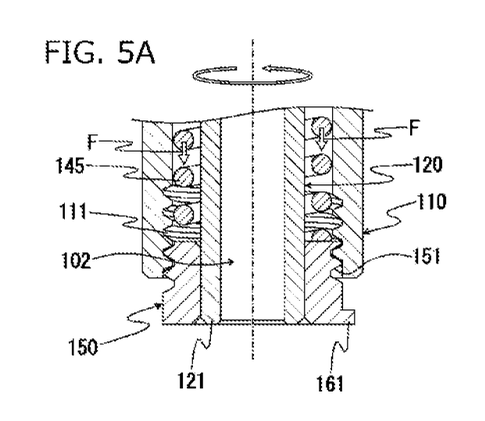
FIG. 5A is an illustrative diagram showing a state wherein the plunger is rotated relative to the base member in the tensioner shown in FIG. 1, for explaining an operation of disengaging the mechanical connection between the plunger and the base member.
Figure 5B:
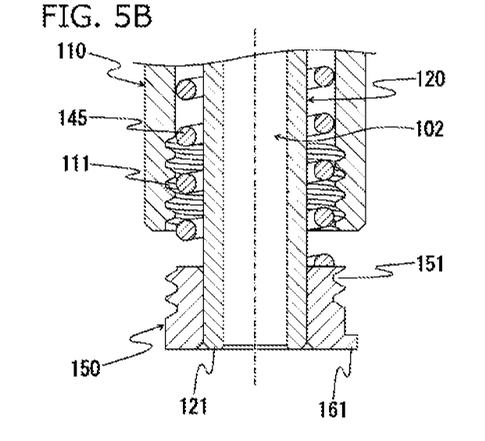
FIG. 5B is an illustrative diagram showing a state wherein the plunger and the base member have been mechanically disengaged in the tensioner shown in FIG. 1, for explaining an operation of disengaging the mechanical connection between the plunger and the base member.

Namely, the mechanical connection between the plunger 110 and the base member 150 is disengaged by rotating the plunger 110 relative to the base member 150 as shown in FIG. 5A (the white arrow indicating the rotating direction of the plunger 110). This releases the spring force F of the compressed coil spring 105 and relief spring 145, so that the tensioner 100 is rendered usable as shown in FIG. 5B (where the plunger 110 can come out of and retract into the tensioner insertion hole 181).

The tensioner 100 of this embodiment can be assembled easily to the object 180 to which the tensioner is mounted, as the mechanical connection between the plunger 110 and the base member 150 can be disengaged by a simple operation of rotating the plunger 110 relative to the base member 150 as described above.

Embodiment 2

The tensioner according to a second embodiment of the present invention has the same configuration as the tensioner 100 according to the first embodiment described above except that the mechanical connection between the plunger and the base member has a different structure.

The mechanical connection between the plunger and the base member in the tensioner according to the second embodiment is achieved by a light press fit of the base member pressed into the rear end opening of the plunger against the resilience of the biasing means.

The base member of the tensioner according to the second embodiment has a tapered outer circumferential surface at one axial end radially reducing frontward.

Figure 6:
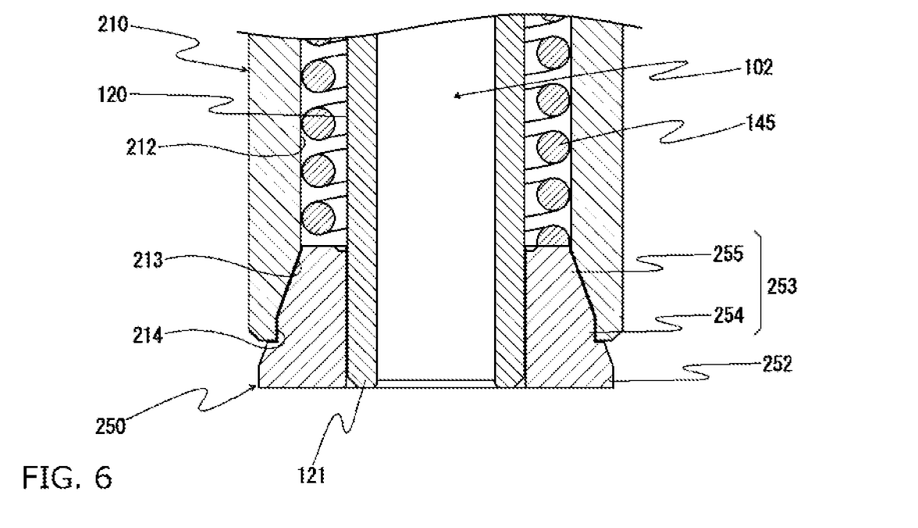
FIG. 6 is a cross-sectional view along an axial direction illustrating part of one configuration example of a tensioner according to a second embodiment of the present invention.

The base member 250 includes, as shown in FIG. 6, a cylindrical base part 252 having a larger outside diameter than the opening diameter of the rear side opening of the plunger 210, and a fitting part 253 continuous with the front end of the base part 252 via a step and lightly pressed into the rear side opening of the plunger 210. The fitting part 253 includes a cylindrical shaft part 254 having an outside diameter that conforms to the opening diameter of the rear side opening of the plunger 210, and a tapered part 255 extending continuously from the front end of the shaft part 254 such as to radially reduce frontward in the axial direction.

The plunger 210 in the tensioner according to the second embodiment has a tapered inner circumferential surface at the rear end opening radially increasing axially rearward to be brought into pressure contact with the tapered outer circumferential surface of the base member 250.

The plunger 210 has an inner space configured by a first space 212 having a constant inside diameter, a second space 213 continuous with the first space 212 and forming a truncated conical cavity that radially enlarges rearward in the axial direction, and a third space 214 continuous with the second space 213 and forming a cylindrical cavity with a larger inside diameter than that of the first space 212, as shown in FIG. 6.

As mentioned above, the plunger 210 and the base member 250 of the tensioner in this embodiment are joined by a mechanical connection that is achieved by lightly press-fitting the base member 250 to the rear end opening of the plunger 210.

Namely, the fitting part 253 of the base member 250 is inserted into the rear side opening of the plunger 210, and the tapered part 255 of the base member 250 is advanced axially forward along the tapered inner circumferential surface of the second space 213 of the plunger 210 against the resilience of the coil spring 105 and relief spring. Thus the outer circumferential surface of the tapered part 255 of the base member 250 makes pressure contact with the inner circumferential surface of the second space 213 of the plunger 210, and the shaft part 254 of the base member 250 fits into the third space 214 of the plunger 210, whereby the plunger 210 and the base member 250 are mechanically joined to each other. When joined, the open end face of the plunger 210 faces and abuts the front face of the base part 252 of the base member 250.

Figure 7A:
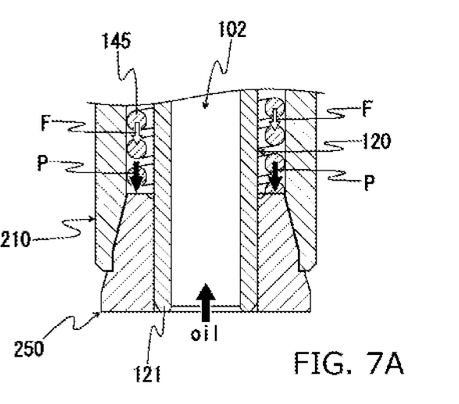
FIG. 7A is an illustrative diagram showing a state wherein oil supplied to the oil pressure chamber is applying a pressure, for explaining an operation of disengaging the mechanical connection between the plunger and the base member in the tensioner shown in FIG. 6.
Figure 7B:
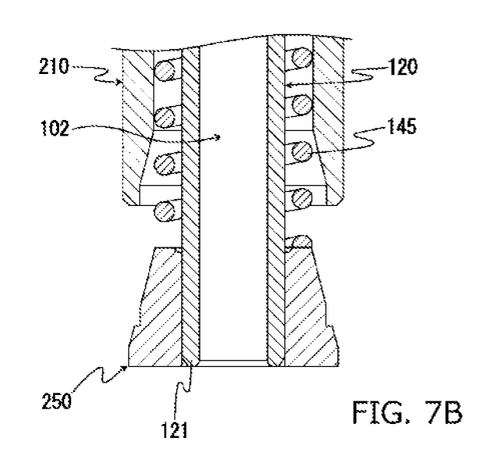
FIG. 7B is an illustrative diagram showing a state wherein the plunger and the base member have been mechanically disengaged in the tensioner shown in FIG. 6, for explaining an operation of disengaging the mechanical connection between the plunger and the base member.

When the tensioner of this embodiment is attached to the object 130 to which the tensioner is mounted (see, for example, FIG. 4), and when oil is supplied to the oil pressure chamber of the tensioner from a hydraulic pressure source such as an oil pump or the like, for example, as shown in FIG. 7A, the front end face of the base member 250 receives the spring force F of the coil spring 105 and relief spring 145 (indicated by white arrows in FIG. 7A) as well as the pressure P of the supplied oil (indicated by solid black arrows in FIG. 7A). This disengages the mechanical connection between the plunger 210 and the base member 250 and releases the spring force F of the coil spring 105 and relief spring 145 so that the tensioner is rendered usable as shown in FIG. 7B (where the plunger 210 can come out of and retract into the tensioner insertion hole of the object to which the tensioner is mounted).

The tensioner of this embodiment can be assembled easily to the object to which the tensioner is mounted, as the mechanical connection between the plunger 210 and the base member 250 can be disengaged by the pressure of oil supplied to the oil pressure chamber being applied to the base member 250 as described above.

Figure 8:
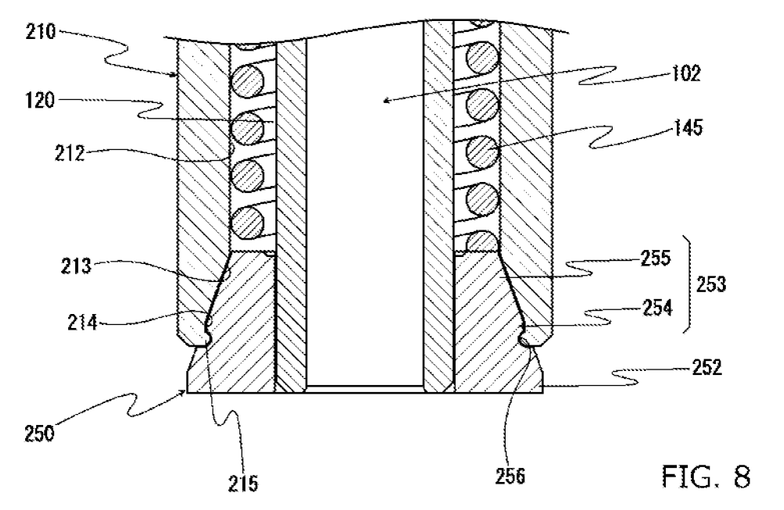
FIG. 8 is a cross-sectional view along an axial direction illustrating part of another configuration example of the tensioner according to the second embodiment of the present invention.

In the tensioner according to the second embodiment of the present invention, as shown in FIG. 8, the base member 250 may be formed with an engaging groove 256 in the outer circumferential surface of the shaft part 254, and the plunger 210 may be formed with an engaging pawl 215 in a rear end portion for engaging with the engaging groove 256 of the base member 250.

In such a tensioner, the mechanical connection between the base member 250 and the plunger 210 is achieved not only by the press-fit of the base member 250 into the plunger 210 but also by the engagement between the engaging pawl 215 of the plunger 210 and the engaging groove 256 of the base member 250. This configuration reliably prevents an unwanted disengagement of the mechanical connection between the plunger 210 and the base member 250 before the attachment of the tensioner, while allowing the mechanical connection between the plunger 210 and the base member 250 to be disengaged by the pressure of oil supplied to the oil pressure chamber.

Embodiment 3

The tensioner according to a third embodiment of the present invention has the same configuration as the tensioner 100 according to the first embodiment described above except that the mechanical connection between the plunger and the base member has a different structure.

The mechanical connection between the plunger and the base member of the tensioner according to the third embodiment is achieved by a pin connection, with the base member loosely fitted into the plunger against the resilience of the biasing means.

Figure 9:
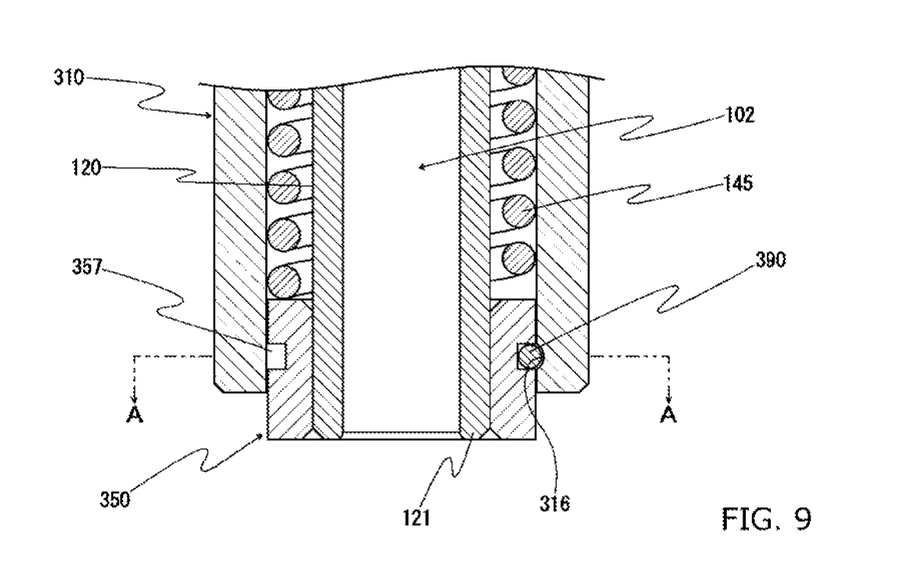
FIG. 9 is a cross-sectional view along an axial direction illustrating part of one configuration example of a tensioner according to a third embodiment of the present invention.
Figure 10:
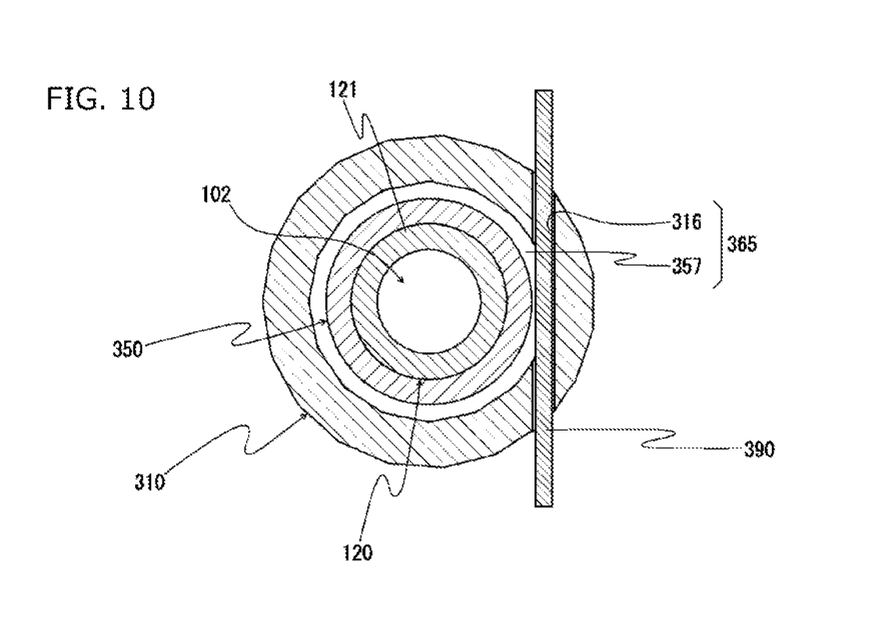
FIG. 10 is a cross-sectional view showing an A-A section of FIG. 9.

The base member 350 of the tensioner according to the third embodiment is cylindrical and includes a circumferentially extending base member fixing groove 357 in an outer circumferential surface of a front end portion that is loosely fitted into the rear side opening of the plunger 310, as shown in FIG. 9 and FIG. 10.

The plunger 310 of the tensioner according to the third embodiment has a plunger fixing hole 316 that forms a stopper pin connection hole 365 for a stopper pin 390 to be removably passed through, together with the base member fixing groove 357 when axially aligned with the base member fixing groove 357.

As described above, the joint between the plunger 310 and the base member 350 of the tensioner according to this embodiment is a mechanical connection achieved by a pin connection.

Namely, the base member 350 is loosely fitted into the rear side opening of the plunger 310 against the resilience of the coil spring 105 and relief spring 145, and the base member fixing groove 357 of the base member 350 and the plunger fixing hole 316 of the plunger 310 are axially aligned with each other. In this state, the stopper pin 390 is inserted into the stopper pin connection hole 365 that is formed by the base member fixing groove 357 and the plunger fixing hole 316, so that the plunger 310 and the base member 350 are mechanically joined.

Figure 11A:
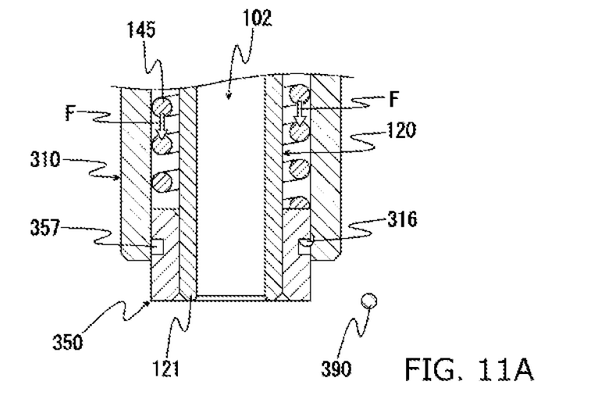
FIG. 11A is an illustrative diagram showing a state wherein a stopper pin has been pulled out, for explaining an operation of disengaging the mechanical connection between the plunger and the base member in the tensioner shown in FIG. 9.
Figure 11B:
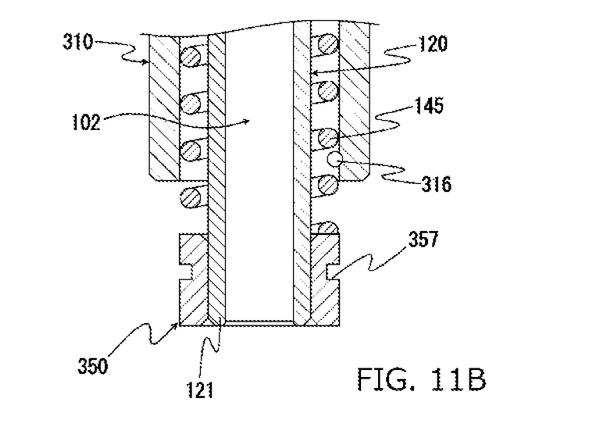
FIG. 11B is an illustrative diagram showing a state wherein the plunger and the base member have been mechanically disengaged in the tensioner shown in FIG. 9, for explaining an operation of disengaging the mechanical connection between the plunger and the base member.

In the tensioner of this embodiment, as shown in FIG. 11A, pulling out the stopper pin 390 disengages the mechanical connection between the plunger 310 and the base member 350, which releases the spring force F of the compressed coil spring 105 and relief spring 145. The tensioner is thus rendered usable as shown in FIG. 11B (where the plunger 310 can come out of and retract into the tensioner insertion hole of the object to which the tensioner is mounted).

After the mechanical connection between the plunger 310 and the base member 350 has been disengaged, for example, the tensioner of this embodiment is attached to the object to which the tensioner is mounted.

The tensioner of this embodiment can be assembled easily to the object to which the tensioner is mounted, as the mechanical connection between the plunger 310 and the base member 350 can be disengaged by a simple operation of pulling out the stopper pin 390 as described above.

While specific examples of the tensioner according to the present invention have been described in the embodiment above, the tensioner according to the present invention is not limited to these examples, and the shapes, positions, sizes, and positional relationships with each other of various constituent parts may be changed in various manners, or variously combined as required.

In the embodiment described above, illustrations in which the plunger protrudes upwards were used and the plunger was described as being protruded in this direction, but the plunger may be arranged to protrude in any direction in accordance with the mode in which it is used.

It is preferable, in the embodiments described above in particular, to dispose the chain tensioner such that the oil reservoir chamber is located higher than the check valve (reversely from the arrangement in the drawings). The relief valve will then be located higher than the oil pressure chamber and the tensioner can have enhanced robustness with respect to air leak possibilities.

The tensioner of the present invention may not necessarily be applied to a chain guide mechanism that uses a guide shoe for slidably guiding a drive chain such as an endless roller chain passing over respective sprockets of a crankshaft and a cam shaft in an engine room, but may also be adopted in applications where the chain is slidably guided directly by the distal end of the plunger.

The tensioner may not necessarily be applied to a transmission mechanism that uses a chain but can also be used for similar transmission mechanisms that use belts, ropes and the like, and can be applied in a variety of industrial fields.

What is claimed is:

1. A tensioner comprising:
   a cylindrical plunger with a closed front end;
   biasing means accommodated in an oil pressure chamber formed inside the cylindrical plunger such as to freely extend and contract; and
   a base member detachably joined to a rear end opening of the cylindrical plunger against resilience of the biasing means, wherein
   the cylindrical plunger and the base member are joined by a mechanical connection that is one of a thread engagement, a light press-fit, and a pin connection,
   the mechanical connection between the base member and the cylindrical plunger fixes the biasing means in a compressed state, and
   disengagement of the mechanical connection releases spring force of the biasing means and the tensioner is rendered usable.

2. The tensioner according to claim 1, wherein
   the cylindrical plunger and the base member are joined by a mechanical connection that is a thread engagement,
   the base member being cylindrical and having an external thread cut in an outer circumferential surface of one axial end portion thereof, and
   the cylindrical plunger having an internal thread cut in an inner circumferential surface at the rear end opening to mate with the external thread.

3. The tensioner according to claim 1, wherein
   the cylindrical plunger and the base member are joined by a mechanical connection that is a light press-fit,
   the base member being cylindrical and lightly press-fit to the rear end opening of the cylindrical plunger such that the mechanical connection between the cylindrical plunger and the base member is disengaged by a pressure of oil supplied to the oil pressure chamber.

4. The tensioner according to claim 3, wherein
the base member has a tapered outer circumferential surface at one axial end radially reducing frontward, with an engaging groove formed in the tapered outer circumferential surface, and
the cylindrical plunger has a tapered inner circumferential surface radially increasing axially rearward to be brought into pressure contact with the tapered outer circumferential surface of the base member, and is formed with an engaging pawl in a rear end portion of the cylindrical plunger to engage with the engaging groove.

5. The tensioner according to claim 1, wherein
the cylindrical plunger and the base member are joined by a mechanical connection that is a pin connection,
the base member being cylindrical and having a circumferentially extending base member fixing groove in an outer circumferential surface of one axial end portion that is loosely fitted into the cylindrical plunger, and
the cylindrical plunger having a plunger fixing hole that forms a stopper pin connection hole for a stopper pin to be removably passed through, together with the circumferentially extending base member fixing groove when axially aligned with the circumferentially extending base member fixing groove.

6. The tensioner according to claim 1, wherein
the base member includes a mounting part for attachment to an object to which the tensioner is mounted.

7. The tensioner according to claim 6, wherein
the mounting part is formed by an engaging projection extending radially outward from an outer circumferential surface of the base member.

* * * * *